United States Patent [19]

Douglas et al.

[11] Patent Number: 5,506,727
[45] Date of Patent: Apr. 9, 1996

[54] TELESCOPIC SIGHT ATTACHMENT TO IMPROVE VIEWING

[76] Inventors: Ronnie R. Douglas, 123 Arietta Shores Dr.; Larry J. Lundy, 720 Honeycomb La., both of Auburndale, Fla. 33823

[21] Appl. No.: 156,126

[22] Filed: Nov. 22, 1993

[51] Int. Cl.⁶ .................................................. G02B 21/00
[52] U.S. Cl. ............................................. 359/600; 33/244
[58] Field of Search ................................... 359/506, 600, 359/601, 611; 33/244; 42/101

[56] References Cited

U.S. PATENT DOCUMENTS

| | | | |
|---|---|---|---|
| 3,315,362 | 4/1967 | Palmer | 359/600 |
| 3,390,931 | 7/1968 | Luning et al. | 359/600 |
| 3,669,523 | 6/1972 | Edwards | 359/600 |
| 4,264,123 | 4/1981 | Mabie | 359/600 |
| 5,181,140 | 1/1993 | Brown et al. | 359/600 |

*Primary Examiner*—Loha Ben
*Assistant Examiner*—James Phan

[57] ABSTRACT

A device attached to the sighting end of a telescopic sight prevents light from entering into the space between the sighting end and the eye of the user. The device includes an attachment member that slidingly and adjustably receives the sighting end, an eyepiece that is angled forwardly toward the user by about eight degrees when in repose so that when an eye socket of the user is placed against the eyepiece, the eyepiece flexes rearwardly by about the same angle so that the view through the device is perfectly aligned with the telescopic sight, and a recoil-absorbing means disposed between the trailing end of the attachment member and the leading end of the eyepiece. The eyepiece has a greater breadth than the attachment member, so the recoil member is stepped upwardly in diameter from the attachment member to the eyepiece. A pair of annular concavities are formed in the recoil-absorbing member to introduce additional flexibility into the structure so that no appreciable recoil is transmitted through the device. A rearward side of the attachment member is thinner than its forward side to accommodate the bolt of a bolt-action rifle.

24 Claims, 3 Drawing Sheets

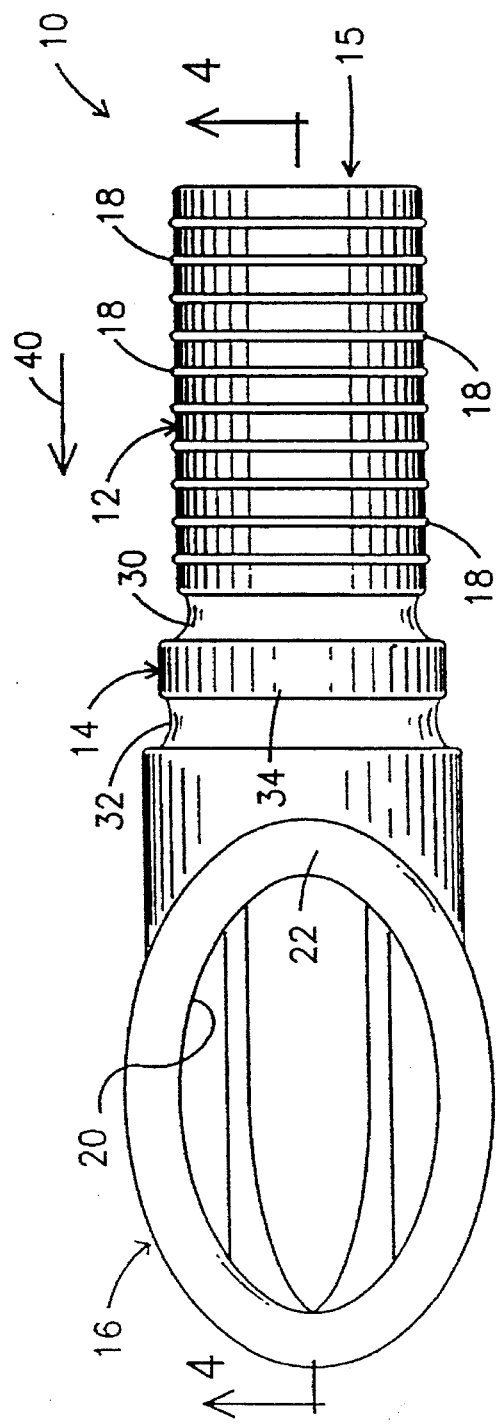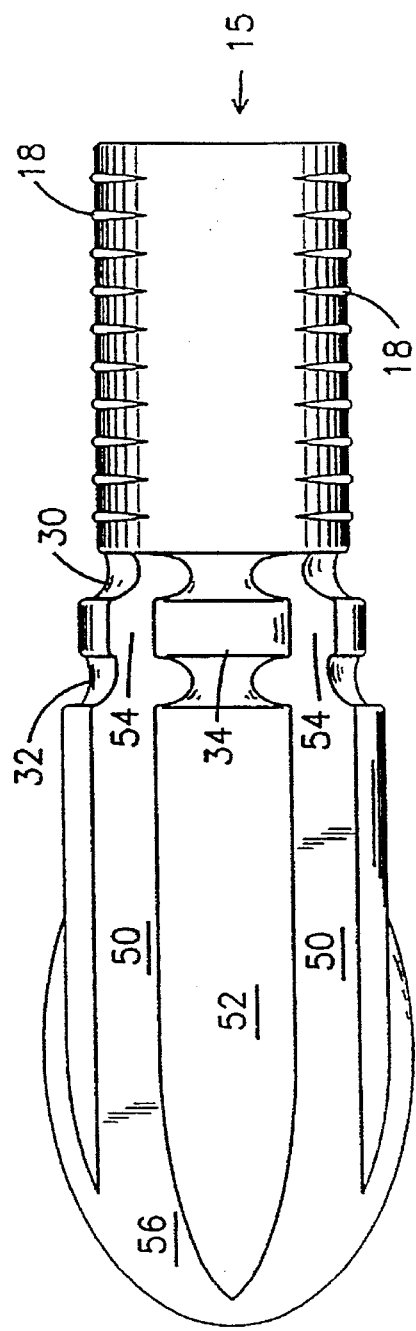

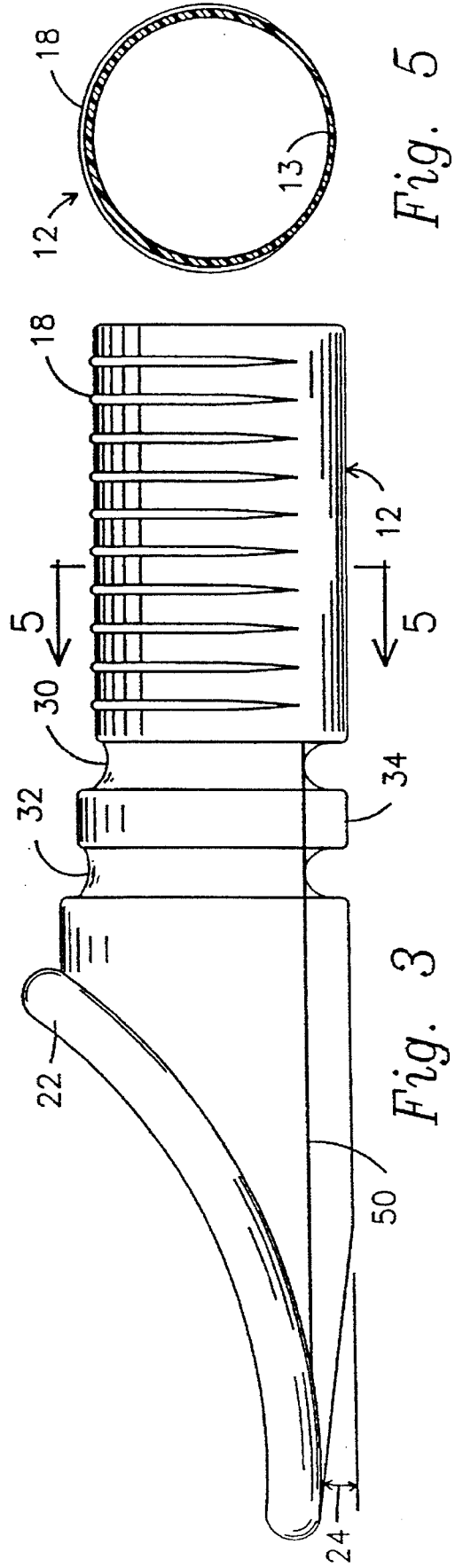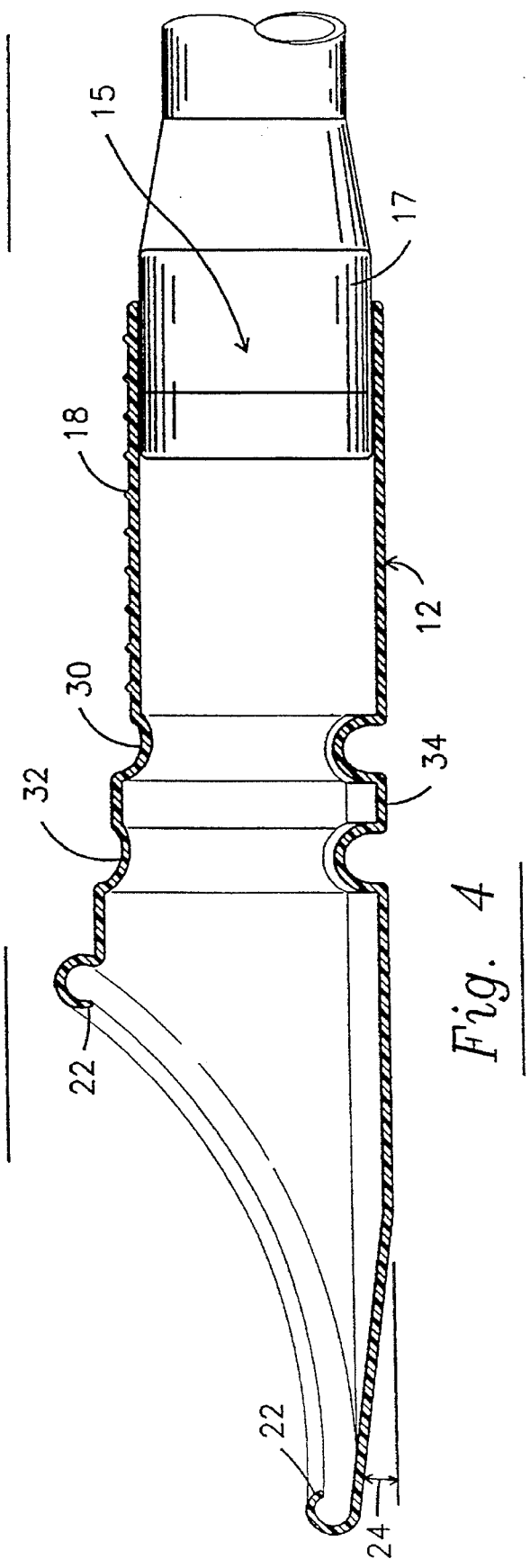

TELESCOPIC SIGHT ATTACHMENT TO IMPROVE VIEWING

BACKGROUND OF THE INVENTION

1. Field of the Invention

This invention relates, generally, to devices for improving the effectiveness of telescopic sights. More particularly, it relates to a device for eliminating light between the sighting end of a telescopic sight and the user's eye.

2. Description of the Prior Art

Game hunters can often see a target with binoculars or the unaided eye, yet be unable to locate the same target in the crosshairs of their telescopic sight. This phenomenon occurs primarily in low light conditions such as early morning or evening. Similarly, glare may cause the same problem under bright light conditions. Both problems are caused by the presence of Light between the sighting end of the telescopic sight (also known as a scope) and the viewer's eye.

One solution to this problem is disclosed in U.S. Pat. No. 3,315,362 to Palmer. The device shown in that disclosure attaches to the sighting end of the scope and blocks out the light between said sighting end and the hunter's eye. Thus, it solves the basic problem. However, the Palmer device does not represent the final culmination of this art because that device can not fit all types of rifles, provides only nominal protection against recoil, and has a complex construction to ensure that the hunter's line of sight will be correct. What is needed, then, is an improved attachment that provides substantial protection against recoil, that is structurally simple yet does not become misaligned when in use, and that can fit different types of scopes.

However, when the prior art is considered as a whole at the time the present invention was made, it was not obvious to those of ordinary skill in this art how the art could be advanced to fulfill the outstanding needs.

SUMMARY OF THE INVENTION

The longstanding but heretofore unfulfilled needs of the art are now fulfilled by a structurally simple scope attachment of elegant design that provides substantial recoil protection, that fits all rifles, and that properly aligns the user's eyes at the time of viewing.

The novel device includes an elongate tubular attachment means having a leading end for adjustably and telescopically receiving the sighting end of a telescopic sight. The attachment means leading end when in repose has a predetermined diameter slightly less than an outer diameter of the sighting end and the attachment means is formed of a radially expandable, resilient material so that it tightly grips the sighting end.

A recoil-absorbing means is integrally formed with a trailing end of the attachment means, and a leading end of an eyepiece means is integrally formed with a trailing end of the recoil-absorbing means. The eyepiece means has a breadth greater than the predetermined diameter of the attachment means, and the recoil-absorbing means has a leading end with a breadth equal to the diameter of the trailing end of the attachment means and a trailing end with a breadth equal to the breadth of the leading end of the eyepiece means to form a transition between the trailing end of the attachment means and the leading end of the eyepiece means. The attachment means, recoil-absorbing means, and eyepiece means are integrally formed with one another and are made of a common predetermined elastomeric material.

The recoil-absorbing means includes a first annular concavity the leading end of which is integral with the attachment means trailing end and a trailing end of which has a predetermined diameter greater than the diameter of the attachment means trailing end. The recoil-absorbing means further includes a uniform diameter plateau member integrally formed with a trailing end of the first annular concavity, and the plateau member has a predetermined breadth greater than the diameter of the trailing end of the attachment means but said breadth is smaller than the breadth of the leading end of the eyepiece means.

The recoil-absorbing means further includes a second annular concavity having a leading end integral with a trailing end of the plateau member and a trailing end integral with the leading end of the eyepiece means, whereby the first and second concavities of the recoil-absorbing member introduce flexibility into the recoil-absorbing member so that rearward travel of the attachment means is not appreciably transmitted to the eyepiece means.

The eyepiece means has an open forward side and a closed rearward side. The closed rearward side has a straight part that extends from a trailing end of the recoil means to a predetermined distance from a trailing end of the eyepiece means, so that the eyepiece means has a forwardly angled part that extends from the predetermined distance from the trailing end of the eyepiece means to the trailing end of the eyepiece means. The forwardly angled part is disposed at about eight degrees relative to the straight part so that when a human eye is positioned against the eyepiece means, the forwardly angled part of the eyepiece means is displaced into substantially straight alignment with the straight part of the eyepiece rearward side, thereby ensuring that the hunter will see the crosshairs straight ahead when he or she looks through the scope.

The attachment means has a rearward side of reduced thickness relative to its forward side to accommodate a bolt of a rifle.

The rearward side of the recoil means includes a rounded part flanked by elongate flats to save materials, and the rearward side of the eyepiece means includes an elongate rounded part flanked by elongate flats to save materials.

The eyepiece means, when viewed in side elevation, has a parabolic profile so that it conforms to the shape of human eye socket, and includes an inwardly rolled flange that circumscribes the eyepiece opening to provide a cushioning means for the eye socket.

A plurality of equidistantly spaced ribs are formed along the extent of the attachment means; they provide indicia to facilitate cutting of the attachment means to shorten it to a length desired by a user of the device.

The attachment means has a tubular configuration. The eyepiece means has a forward side of tubular configuration and a rearward side that includes a tubular part and a pair of flats flanking the tubular part.

Thus it should be understood that the most important objects of the invention are to provide an integrally formed device that fits all scopes, that protects the user from recoil and that is slightly misaligned when in repose so that it enters into alignment when in use.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a top plan view of an illustrative embodiment of the invention;

FIG. 2 is a bottom plan view thereof;

FIG. 3 is a side elevational view thereof;

FIG. 4 is a longitudinal sectional view taken along line 4—4 in FIG. 1;

FIG. 5 is a transverse sectional view taken along line 5—5 in FIG. 3;

DETAILED DESCRIPTION OF THE PREFERRED EMBODIMENT

Figure 6:
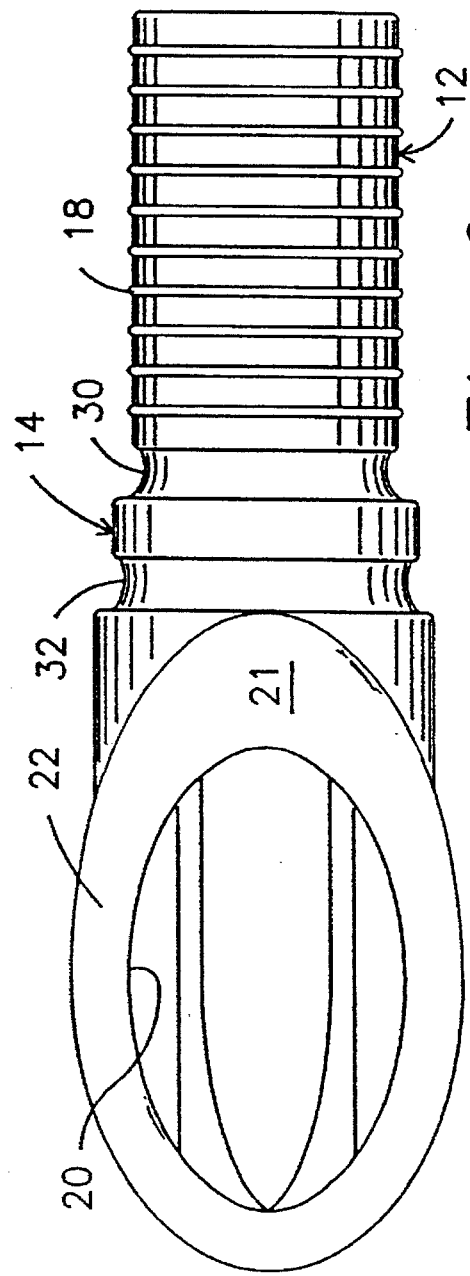
FIG. 6 is a top plan view of an alternative embodiment.

Referring now to FIG. 1, it will there be seen that an exemplary embodiment of the invention is denoted 10 as a whole. Device 10 includes three primary parts: elongate attachment means 12, recoil-absorbing means 14, and eyepiece means 16, all of which are integral with their contiguous part to form a monolithic whole.

To facilitate the description that follows, the front or forward side of the device will be considered as the part shown in the top plan view of FIG. 1, and the back or rearward side of the device will be considered as the part shown in the bottom plan view of FIG. 2. When the device 10 is positioned on a scope for a left-handed hunter, it will appear as in FIG. 1 from the viewpoint of the hunter; for a right-handed person, FIG. 1 would be horizontally flipped and the eyepiece 16 would be on the right end of the drawing.

Attachment means 12 is tubular in configuration; as best seen in FIG. 5, its cylindrical wall is relatively thin at the rearward side of the device as at 13, and relatively thick at all other locations. This provides clearance space for the bolt of a bolt action rifle.

A plurality of equidistantly spaced annular ribs, collectively denoted 18, are formed about the circumference of attachment means 12 along the extent thereof as depicted in FIGS. 1–4. Preferably, they are spaced about one-quarter inch apart. To install device 10, the open end 15 of attachment means 12 is slid onto the trailing end of a scope 17 (FIG. 4), until about one inch of the scope's extent has been ensleeved. Thus, when the device is properly installed, the trailing end of the scope will be inserted to the fourth rib 18 from said open end 15 of the attachment means. Device 10 is made of Neoprene (TM) synthetic rubber, or similar suitable elastomeric material; accordingly, attachment means 12 is radially expandable to accept said trailing end of the scope. The inner diameter of the attachment means is slightly smaller than the outer diameter of the trailing end of the scope so that the fit therebetween is snug.

Some individuals will find the initial fit as above-described to place the eyepiece 16 too remote from the trailing end of the scope and will desire said eyepiece to be closer to said trailing end. To move the eyepiece one-quarter inch toward said trailing end, device 10 is removed from the scope and a knife is used to cut the trailing end of attachment means 12 at the first rib 18. To move the eyepiece one-half inch closer, the cut is made at the second rib from the end, and so on, until the hunter is comfortable with the position of device 10.

Eyepiece means 16 includes a large eye socket-receiving opening 20; it is large enough to receive the frame of a pair of eyeglasses. As best shown in FIG. 4, an inwardly rolled flange 22 circumscribes opening 20 so that the hunter's eye socket is comfortably received. That Figure also depicts the parabolic shape of the opening when seen in side elevation; that shade allows the eyepiece to conform to the eye socket to ensure the blocking out of substantially all light between the sighting end of the scope and the hunter's eye.

Figure 7:
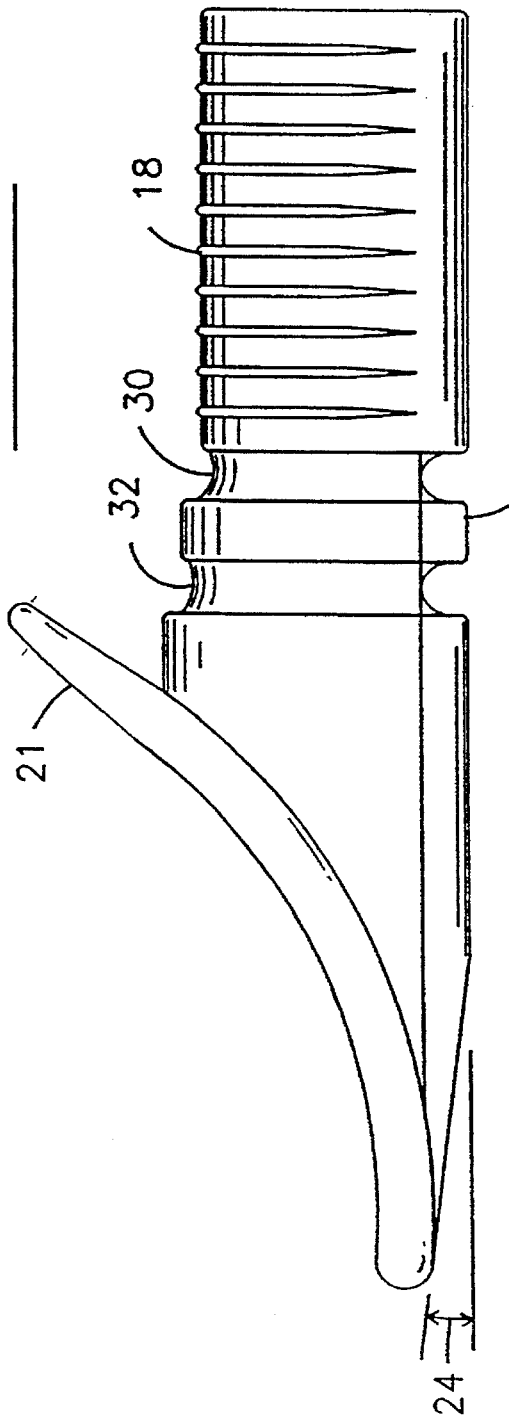
FIG. 7 is a side elevational view of said alternative embodiment.

In an alternative embodiment, depicted in FIGS. 6 and 7, an integral flap 21, mounted about a predetermined extent of the perimeter of opening 20, has utility in blocking out light for individuals who wear glasses. It is made of any opaque, flexible material, and may be made of the same material as the other parts of device 10. The flap is perhaps best understood by comparing FIGS. 1 and 6; the extra extension of flange 22, called flap 21, extends to the nose piece of a conventional pair of spectacles and effectively blocks out light as aforesaid.

When a hunter places his or her eye socket within opening 20 to look through the scope, the act of placing the eye socket against flange 22 will push the eyepiece means 16 rearwardly, i.e., away from the hunter. This will misalign the eye with the crosshairs of the scope. Accordingly, as depicted in FIGS. 3, 4, and 7, an eight degree, forwardly-directed angle is formed in the rearward side of the eyepiece as at 24 so that said rearward side will be angled forwardly when the device 10 is in repose and properly positioned on the scope. In other words, the trailing end of the eyepiece is angled forwardly when the eyepiece is in repose. When the hunter places his or her eye socket against flange 22, said trailing end of the eyepiece will be displaced toward the rear and the angle 24 will be straightened out; this places the hunter's eye in proper alignment with the crosshairs of the scope. The eight degree angle works well with synthetic rubber, but could be changed according to the resiliency of substitute materials. Of course, small variations from said angle are within the scope of this invention. Large variations from said angle are also within the scope of this invention where different materials are used to change the flexibility of device 10.

It should be observed from the drawings that the breadth of eyepiece 16 is greater than the diameter of attachment means 12. Significantly, such parts are interconnected by recoil-absorbing means 14; thus, the leading end of said means 14 has the same diameter as the trailing end of attachment means 12 and the trailing end of means 14 has the same breadth as the leading end of eyepiece means 16.

More particularly, recoil-absorbing means 14 has three parts: first or leading concave annular weakening means 30, second or trailing concave annular weakening means 32, and plateau member 34 therebetween. Note that the leading end of the first weakening means 30 has the same breadth as the trailing end of attachment means 12, that the trailing end of the first weakening means has the same breadth as the leading end of plateau member 34, that the leading end of the second weakening means 32 has the same breadth as the trailing end of the plateau member, and that the trailing end of the second weakening means has the same breadth as the leading end of eyepiece means 16.

When a recoil appears on attachment means 12, said attachment means is displaced toward the eye socket of the hunter, as indicated by directional arrow 40 in FIG. 1. This movement, if small, causes weakening means 30 to collapse so that the force is not transmitted to the hunter's eye socket. If the recoil is large, weakening means 30 may collapse completely, but much of the recoil force will be dissipated prior to said collapse. Remaining recoil is then absorbed by the second weakening means 32. It should therefore be understood that the use of a single weakening means is within the scope of this invention, as is the use of three or more of said weakening means.

Although device 10 could be manufactured with all three of its main parts having a generally tubular configuration, it saves materials to somewhat flatten the recoil-absorbing means 14 and eyepiece 16 on the respective rearward sides thereof. Some roundness should be maintained to provide a good line of sight within the device, but as best shown in FIG. 2, elongate flats 50, 50 may be provided on opposite sides of the rounded part 52 of eyepiece means 16, and flats 54, 54 may be provided on opposite sides of the weakening means and plateau member of the recoil-absorbing means 14. Said flats 50 and 54 are contiguous and integral with one another. Similarly, the space generally denoted 56 at the trailing end of eyepiece 16 may be flattened as well.

It should also be noted that the synthetic rubber composition of the novel device 10 enables the device as a whole to serve as a recoil-absorbing means.

The device should be black in color to optimize its performance. When properly attached to the scope, it will block out all light between the sighting end of the scope and the viewer's eye, thereby enabling hunting in low light conditions at the beginning and end of the daylight hours. Advantageously, the device also overcomes glare problems under bright sunlight conditions.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A device for preventing light from entering into a space between a human eye and the sighting end of a telescopic sight, comprising:

an elongate tubular attachment means having a leading end for adjustably and telescopically receiving the sighting end of a telescopic sight;

said attachment means leading end when in repose having a predetermined diameter slightly less than an outer diameter of said sighting end and said attachment means being formed of a radially expandable, resilient material so that it tightly grips said sighting end;

a recoil-absorbing means integrally formed with a trailing end of said attachment means;

an eyepiece means integrally formed with a trailing end of said recoil-absorbing means;

said eyepiece means having a breadth greater than the predetermined diameter of said attachment means;

said recoil-absorbing means having a leading end with a breadth equal to the diameter of the trailing end of the attachment means and a trailing end with a breadth equal to the breadth of the eyepiece means to form a transition between said trailing end of said attachment means and the leading end of said eyepiece means;

said attachment means, recoil-absorbing means, and eyepiece means being integrally formed with one another of a common predetermined, elastomeric material;

said recoil-absorbing means including a first annular concavity having a leading end integral with said attachment means trailing end and a trailing end having a predetermined diameter greater than the diameter of said attachment means trailing end;

said recoil-absorbing means further including a uniform diameter plateau member integrally formed with a trailing end of said first annular concavity, said plateau member having a predetermined breadth greater than the diameter of said trailing end of said attachment means but smaller than the breadth of the leading end of said eyepiece means;

said recoil-absorbing means further including a second annular concavity having a leading end integral with a trailing end of said plateau member and a trailing end integral with said leading end of said eyepiece means;

whereby the first and second concavities of said recoil-absorbing member introduce flexibility into the recoil-absorbing member so that rearward trammel of said attachment means is not appreciably transmitted to said eyepiece means.

2. The device of claim 1, wherein said eyepiece means has an open forward side and a closed rearward side;

wherein said closed rearward side has a straight part that extends from a trailing end of said recoil means to a predetermined distance from a trailing end of said eyepiece means;

wherein said eyepiece means has a forwardly angled part that extends from said predetermined distance from said trailing end of said eyepiece means to said trailing end of said eyepiece means; and wherein said forwardly angled part is disposed at about eight degrees relative to said straight part so that when a human eye is positioned against said eyepiece means, the forwardly angled part of said eyepiece means is displaced into substantially straight alignment with said straight part of said eyepiece means rearward side.

3. The device of claim 1, wherein said attachment means has a rearward side of reduced thickness relative to its forward side to accommodate a bolt of a rifle.

4. The device of claim 2, wherein the rearward side of said recoil means includes a rounded part flanked by elongate flats to save materials.

5. The device of claim 2, wherein the rearward side of said eyepiece means includes an elongate rounded part flanked by elongate flats to save materials.

6. The device of claim 1, wherein said eyepiece means, in side elevation, has a parabolic profile so that it conforms to a human eye socket.

7. The device of claim 6, further comprising an inwardly rolled flange that circumscribes said eyepiece means opening to provide a cushioning means for said human eye socket.

8. The device of claim 1, further comprising a plurality of equidistantly spaced ribs formed along the extent of said attachment means, said ribs providing indicia to facilitate cutting of said attachment means to shorten said attachment means to a length desired by a user of said device.

9. The device of claim 1, wherein said attachment means has a tubular configuration, wherein said eyepiece means has a forward side of tubular configuration and a rearward side that includes a tubular part and a pair of flats flanking said tubular part.

10. A device for preventing light from entering into a space between a human eye and the sighting end of a telescopic sight, comprising:

- an elongate tubular attachment means having a leading end for adjustably and telescopically receiving the sighting end of a telescopic sight;
- said attachment means leading end when in repose having a predetermined diameter slightly less than an outer diameter of said sighting end and said attachment means being formed of a radially expandable, resilient material so that it tightly grips said sighting end;
- a recoil-absorbing means integrally formed with a trailing end of said attachment means;
- an eyepiece means integrally formed with a trailing end of said recoil-absorbing means;
- said eyepiece means having a breadth greater than the predetermined diameter of said attachment means;
- said recoil-absorbing means having a leading end with a breadth equal to the diameter of the trailing end of the attachment means and a trailing end with a breadth equal to the breadth of the leading end of the eyepiece means to form a transition between said trailing end of said attachment means and the leading end of said eyepiece means;
- said attachment means, recoil-absorbing means, and eyepiece means being integrally formed with one another of a common predetermined, elastomeric material;
- said eyepiece means having an open forward side and a closed rearward side;
- said eyepiece means rearward side having a straight part that extends from a trailing end of said recoil means to a predetermined distance from a trailing end of said eyepiece means;
- said eyepiece means having a forwardly angled part that extends from said predetermined distance from said trailing end of said eyepiece means to said trailing end of said eyepiece means;
- said forwardly angled part being disposed at about eight degrees relative to said straight part so that when a human eye is positioned against said eyepiece means, the forwardly angled part of said eyepiece means is displaced into substantially straight alignment with said straight part of said eyepiece means rearward side.

11. The device of claim 10, wherein the rearward side of said recoil means includes a rounded part flanked by elongate flats to save materials.

12. The device of claim 10, wherein the rearward side of said eyepiece means includes an elongate rounded part flanked by elongate flats to save materials.

13. The device of claim 10, wherein said eyepiece means, in side elevation, has a parabolic profile so that it conforms to the shape of a human eye socket.

14. The device of claim 10, further comprising an inwardly rolled flange that circumscribes said eyepiece means opening to provide a cushioning means for said human eye socket.

15. The device of claim 10, further comprising a plurality of equidistantly spaced ribs formed along the extent of said attachment means, said ribs providing indicia to facilitate cutting of said attachment means to shorten said attachment means to a length desired by a user of said device.

16. The device of claim 10, wherein said attachment means has a tubular configuration, wherein said eyepiece means has a forward side of tubular configuration and a rearward side that includes a tubular part and a pair of flats flanking said tubular part.

17. A device for preventing light from entering into a space between a human eye and the sighting end of a telescopic sight, comprising:

- an elongate tubular attachment means having a leading end for adjustably and telescopically receiving the sighting end of a telescopic sight;
- said attachment means leading end when in repose having a predetermined diameter slightly less than an outer diameter of said sighting end and said attachment means being formed of a radially expandable, resilient material so that it tightly grips said sighting end;
- a recoil-absorbing means integrally formed with a trailing end of said attachment means;
- an eyepiece means integrally formed with a trailing end of said recoil-absorbing means;
- said eyepiece means having a breadth greater than the predetermined diameter of said attachment means;
- said recoil-absorbing means having a leading end with a breadth equal to the diameter of the trailing end of the attachment means and a trailing end with a breadth equal to the breadth of a leading end of the eyepiece means to form a transition between said trailing end of said attachment means and the leading end of said eyepiece means;
- said attachment means, recoil-absorbing means, and eyepiece means being integrally formed with one another of a common predetermined, elastomeric material;
- said eyepiece means having an open forward side and a closed rearward side;
- said attachment means having a rearward side of reduced thickness relative to its forward side to accommodate a bolt of a rifle.

18. The device of claim 17, further comprising:

- said eyepiece means having an open forward side and a closed rearward side;
- said eyepiece means rearward side having a straight part that extends from a trailing end of said recoil means to a predetermined distance from a trailing end of said eyepiece means;
- said eyepiece means having a forwardly angled part that extends from said predetermined distance from said trailing end of said eyepiece means to said trailing end of said eyepiece means;
- said forwardly angled part being disposed at about eight degrees relative to said straight part so that when a human eye is positioned against said eyepiece means, the forwardly angled part of said eyepiece means is displaced into substantially straight alignment with said straight part of said eyepiece means rearward side.

19. The device of claim 17, wherein the rearward side of said recoil means includes a rounded part flanked by elongate flats to save materials.

20. The device of claim 17, wherein the rearward side of said eyepiece means includes an elongate rounded part flanked by elongate flats to save materials.

21. The device of claim 17, wherein said eyepiece means, in side elevation, has a parabolic profile so that it conforms to the shape of a human eye socket.

22. The device of claim 17, further comprising an inwardly rolled flange that circumscribes said eyepiece means opening to provide a cushioning means for said human eye socket.

23. The device of claim 17, further comprising a plurality of equidistantly spaced ribs formed along the extent of said attachment means, said ribs providing indicia to facilitate cutting of said attachment means to shorten said attachment means to a length desired by a user of said device.

24. The device of claim 17, wherein said attachment means has a tubular configuration, wherein said eyepiece means has a forward side of tubular configuration and a rearward side that includes a tubular part and a pair of flats flanking said tubular part.

\* \* \* \* \*